Jan. 12, 1960   K. W. SWAIN   2,921,250
COORDINATED STATIC POWER RECTIFIERS AND CURRENT-LIMITING FUSES
Filed June 13, 1955   2 Sheets-Sheet 1

Inventor:
Kenneth W. Swain,
by [signature] Attorney

Jan. 12, 1960         K. W. SWAIN         2,921,250
COORDINATED STATIC POWER RECTIFIERS AND CURRENT-LIMITING FUSES
Filed June 13, 1955         2 Sheets-Sheet 2

Inventor:
Kenneth W. Swain
by his Attorney

United States Patent Office

2,921,250
Patented Jan. 12, 1960

2,921,250

COORDINATED STATIC POWER RECTIFIERS AND CURRENT-LIMITING FUSES

Kenneth W. Swain, Hampton Falls, N.H., assignor to The Chase-Shawmut Company, Newburyport, Mass.

Application June 13, 1955, Serial No. 514,828

25 Claims. (Cl. 321—14)

This invention relates to systems of coordinated power rectifiers and current-limiting fuses, and more particularly to systems of coordinated germanium power rectifiers and current-limiting fuses. From a more general point of view this invention relates to ultra-rapid protection at relatively small overcurrents.

The present application is a continuation-in-part of my copending patent application Ser. No. 476,936, filed December 22, 1954, for Fuse Structures, now U.S. Patent 2,861,150.

Certain static power rectifiers such as, for instance, copper oxide rectifiers or selenium rectifiers can be effectively protected by current-limiting fuses. However, it was not possible heretofore to achieve proper coordination of current-limiting fuses with germanium power rectifiers.

Germanium power rectifiers operate at a very high current per cell. The current density in a germanium rectifier cell, or germanium power diode, may be about 100 to 1000 times greater than in a copper oxyde or a selenium rectifier cell. As a result, relatively large amounts of heat are being generated in a relatively limited space. The permissible operating temperature of a germanium rectifier at normal full load may be 30 degrees centigrade over an ambient of 35 degrees centigrade. At higher ambient temperatures the rectifier must be derated either by current or by voltage. Generation of relatively large amounts of heat in a relatively limited space calls for effective cooling means such as forced drafts of air, or liquid immersion. Rectifiers wherein heat is generated at a relatively high rate in a relatively small space or, in other words, rectifiers wherein heat is generated at such a high rate in such a small space as to make highly effective cooling means imperative and wherein, in addition thereto, materials or elements are included which are very sensitive to excessive heat—all of which applies to germanium rectifiers—require a different, i.e. a much more rapid protective action by current-limiting fuses than other types of apparatus. The fastest prior art current-limiting fuses are far too slow to effectively coordinate with rectifier cells which carry very high currents, resulting in current densities 100 to 1000 times larger than normally encountered in copper oxide rectifier cells or selenium rectifier cells and which include critical materials or parts likely to be impaired, or damaged, by a relatively small margin of excessive heat.

It is, therefore, one object of this invention to provide systems of coordinated static power rectifiers and current-limiting fuses wherein the rectifiers operate normally at relatively high current intensities and relatively high current densities, wherein highly effective cooling means are relied upon for heat dissipation, and wherein the current-limiting fuses are sufficiently fast to provide adequate protection for this type of rectifiers, particularly in the critically dangerous range of relatively small overcurrents, such as less than 5 times the rated current of the rectifier cells and fuses.

Another object of the invention is to provide systems of coordinated static power rectifiers and current-limiting fuses wherein rectification is effected by germanium rectifier cells or germanium power diodes, or by rectifier cells having operating characteristics similar to germanium power diodes, and wherein the current-limiting fuses are designed with a view to very rapid protection against overcurrents in the order of a small multiple of the rated current of the rectifier cells and fuses.

Another object of the invention is to provide current-limiting fuses having a relatively high current-carrying capacity and capable of interrupting overloaded circuits within about 1/60 of a second on overcurrents as low as five times the rated current of the fuse, or even on smaller overcurrents. Still another object of the invention is to provide current-limiting fuses capable of carrying relatively high currents and considerably faster than prior art current-limiting fuses on occurrence of relatively small overcurrents.

A further object of the invention is to provide current-limiting fuses having composite- or multimetallic-fuse links considerably faster in the range of five times the current rating, or at smaller overcurrents, than the fastest prior art silver-sand fuses.

Further objects and advantages of this invention will become apparent as the following description proceeds, and the features of novelty which characterize this invention will be pointed out with particularity in the claims annexed to and forming part of this specification.

For a better understanding of the invention reference may be had to the accompanying drawing illustrating the invention, wherein.

Figure 1:
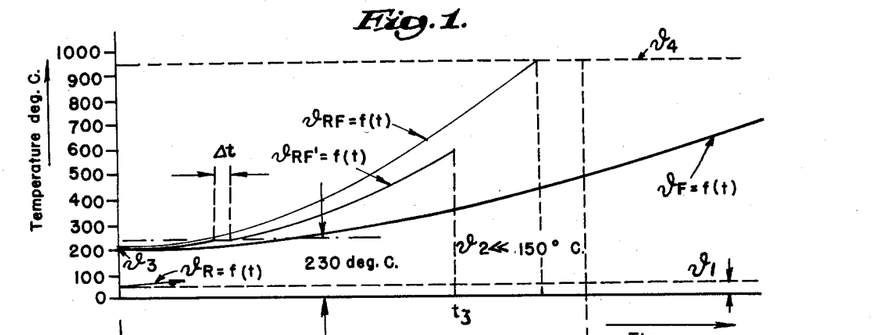
Figs. 1 and 1a are diagrams illustrating some of the basic requirements of germanium power rectifier and current-limiting fuse coordination and the operation of a coordinated static power rectifier and a current-limiting fuse.
Figure 1A:
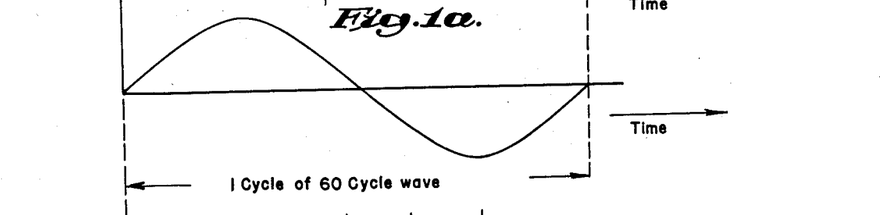

In Fig. 1 wherein temperatures are plotted against time the temperature level at which a germanium rectifier cell is supposed to safely operate at normal loads has been designated $S_1$. The temperature $S_1$ is 30 degrees centigrade over a 20 degree centigrade ambient, i.e. $S_1=50$ degrees centigrade. The level of the danger temperature $S_2$ which ought never to be exceeded by a germanium rectifier cell is above $S_1$ and well below 150 degrees centigrade, say at about 80 to 100 degrees centigrade. Germanium power diodes are generally made in the form of a sandwich with a wafer of germanium about .020" thick arranged between a layer of indium and a layer of antimony or tin. This sandwich is particularly sensitive to temperatures above 100 degrees. Another consideration is the low fusing point of indium—155 degrees centigrade—compelling to keep $S_2$ well below that temperature. Among the reasons why germanium rectifiers are so critical to relatively small increases of heat generation therein the fact may be mentioned that reverse currents increase exponentially with temperature, resulting in a rapid increase of reverse losses with temperature. Increased reverse losses further increase temperature, resulting in an additional increase of reverse currents exponentially with the further increase in temperature, etc., thus pyramiding the danger resulting from excess temperatures.

The temperature may rise from $S_1$ to $S_2$ in a number of different ways, depending upon the particular condition causing the current to be excessive. The small arrow at the left of Fig. 1 designated $S_R=f(t)$ indicates the initial rise in temperature of a germanium cell above the $S_1$ level on occurrence of a particular fault.

The relatively high current intensity and the relatively high current density in a germanium power rectifier cell call for protection by a fuse having a relatively high current-carrying capacity or, in other words, for a fuse having one or more fuse links of the ribbon-type. Since $S_2-S_1$ and the mass of the rectifier sandwich are both relatively small, the time required for the temperature to rise from $S_1$ to $S_2$ is relatively short and since the time within which the fuse must blow must be shorter than the time required for the rectifier cell to rise from $S_1$ to $S_2$, protection of germanium power rectifier cells calls for very fast acting, i.e. very fast blowing, fuses. In other words, since a germanium rectifier cell operates normally relatively close to the danger temperature $S_2$ thereof and since relatively little energy and time is required to bring its temperature from the normal operating temperature $S_1$ up to the danger temperature $S_2$, a germanium power rectifier cell protective fuse must be able to interrupt an overloaded cell circuit within a very short interval of time. Prior art current-limiting fuses are much too slow in the low overload range to provide the kind of protection required by germanium power rectifier cells.

The common means for imparting high speed characteristics to current-limiting fuses with ribbon type fuse links is to provide the latter with one or more portions of reduced cross-sectional area or necks. The curve $S_F=f(t)$ in Fig. 1 illustrates diagrammatically the mode of operation of a typical prior art current-limiting fuse with a ribbon type fuse link having one or more portions of reduced cross-sectional area or necks to impart to it highest possible speed of response. Reference character $S_3$ has been applied to indicate the temperature at which the neck of the fuse link normally operates, i.e. when the fuse is carrying its rated current.

Assuming occurrence of a predetermined overcurrent, the temperature of a germanium rectifier cell may rise from $S_1$ to $S_2$ within a given time and reach $S_2$ at a time $t_1$. At the occurrence of that predetermined overcurrent the temperature of the point of minimum cross-section or neck of a ribbon-type fuse link may rise from $S_3$ according to the exponential characteristic $S_F=f(t)$ to the fusing temperature $S_4$ of the metal of which the fuse link is made and reach $S_4$ at a time $t_2$ (not indicated in the drawing). If the fuse link is made of silver, of which it is generally made, $S_4 \sim 960$ degrees centigrade.

A relatively small interval of time elapses between the time $t_2$ at which the neck of the fuse link reaches the fusing point and the time at which the current in the rectifier circuit begins to decay by virtue of rupture of the fuse link, formation of an arc in the fuse and concomitant insertion of arc resistance into the circuit. To simplify the present analysis the aforementioned time interval will be neglected, i.e. it will be assumed that rupture of the fuse link, arcing and current decay begin at the time when the temperature of the point of smallest cross-sectional area or neck of the fuse link reaches the fusing point $S_4$ of the metal of which the fuse link is made.

It is apparent from Fig. 1 that the average rate of rise of the temperature of the restricted cross-section portion of the fuse link is much more rapid than the average rate of rise of the temperature of the germanium rectifier cell (of which only the initial phase has been shown in Fig. 1). Yet, the rectifier cell may reach the danger temperature $S_2$ before the fuse link reaches the fusing and rupture point $S_4$.

The situation with which one is confronted is a veritable temperature race, i.e. a race at high rates of change of temperature, between the temperature of the rectifier cell and the temperature of the neck of the fuse link. It is a race to thermal self-destruction. The germanium rectifier ought to be saved by the self-destruction of the current-limiting fuse. Normally, i.e. in applications other than germanium power rectifiers, the temperature race is readily won by the current-limiting fuse with its fast response to major fault currents. Yet the problem of germanium rectifier protection is fundamentally different from normal applications of current-limiting fuses inasmuch as it calls for a speed of response in the small overcurrent range comparable to the speed of response of prior art current-limiting fuses in the major fault current range.

One way of assuring that the temperature race between the germanium power rectifier cell and the current-limiting fuse be won by the latter is by decreasing $S_4-S_3$ by increasing $S_4$ or, in other words, by giving a starting advantage to the current-limiting fuse and by decreasing the temperature span to be covered by the latter. Increasing the normal operating temperature $S_3$ of the neck of a ribbon-type fuse link from say 200–300 degrees centigrade to say 600 degrees centigrade or more may be conducive to achieving a sufficient increase of the speed of the fuse to protect germanium power rectifier cells against relatively small overcurrents; yet such an increase of $S_3$ cannot normally be tolerated because it tends to result in excessive heat generation, reducing the current-carrying capacity of the fuse link well below that which is required, and also tending to thermally destroy the insulating material of which the casing of the fuse is made.

Figures 3, 4, 5:
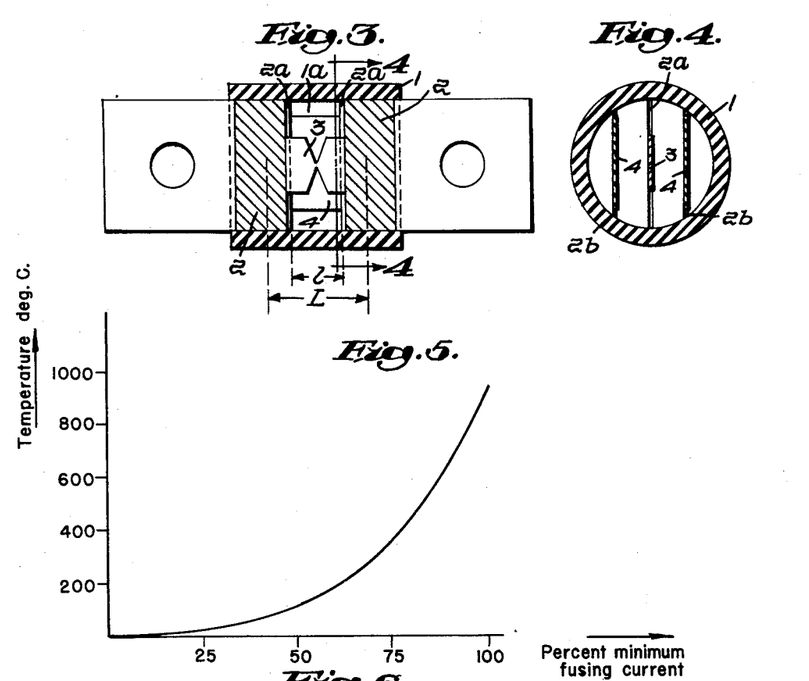
Fig. 3 is a longitudinal section of a current-limiting fuse as such intended to form an integral part of the coordinated rectifier fuse system shown in Fig. 2.
Fig. 4 is a section along 4—4 of Fig. 3.
Fig. 5 is a diagram showing the dependence of temperature on current in terms of minimum fusing current and Fig. 6 are time current curves of current-limiting fuses embodying the invention.

Fig. 5 suggests how little can be gained in terms of speed at small overcurrents by increasing the normal operating temperature of the neck of a fuse link. In this figure temperatures have been plotted against percent minimum fusing current. To minimize the time elapsing between occurrence of the overcurrent and blowing of the fuse, the fuse must normally carry a relatively high percentage of its minimum fusing current, tending to result in intolerably high temperatures and in excessive heat generation.

In order to better define the speed requirements of germanium power rectifier protection, three overcurrents $i_3 > i_2 > i_1$ may be considered. Since $i_3 > i_2 > i_1$, the average rate of rise of temperature both at the germanium power rectifier cell and the neck portion of the current-limiting fuse will be highest upon occurrence of current $i_3$, smallest upon occurrence of current $i_1$ and have an intermediate value upon occurrence of current $i_2$. Currents $i_3$, $i_2$ and $i_1$ are assumed not to have arbitrary intensities. Current $i_3$ is assumed to be a current sufficiently high to blow a given current-limiting fuse in less than 1 cycle of a 60 cycle current wave. Current $i_2$ is assumed to be a current sufficiently high to blow the same fuse within 1 cycle of a 60 cycle current wave, and current $i_1$ is assumed to be so small as to require more than 1 cycle of a 60 cycle current wave to blow the fuse. The speed of a current-limiting fuse at low overcurrents can be measured by the ratio $\rho$ of the current required to blow the fuse within 1 cycle of a 60 cycle current wave to the rated current of the fuse. The rated current of a fuse is understood to be the current which the fuse is able to carry continuously without excessive heating of any of the constituent parts thereof. The rated currents generally indicated by manufacturers of fuses on their products are close to, yet less than, the maximum current which the particular fuse is capable of safely carrying continuously. To provide adequate current-limiting fuse protection for a germanium rectifier the ratio $\rho$ of the current required to blow the fuse within one cycle of a 60 cycle current wave or within $\frac{1}{60}$ sec. to the rated current of the fuse ought to be less than 5:1 and should preferably be in the range between 4:1 to 3:1. These are empirical figures which must be met for proper coordination of the fuse and the rectifier.

The aforementioned ratio ρ is much higher for all prior art current-limiting fuses than the aforementioned figures found to be necessary and desirable for adequate protection of germanium power rectifiers. Even the particularly fast prior art current-limiting fuses having a reduced cross-section portion or neck portion approximating a point heat source to the extent permitted by current manufacturing technology lack the speed required for germanium power rectifier protection.

I have found that current-limiting fuses with ribbon-type fuse links having one single reduced cross-section portion or neck approximating a point heat source have sufficiently small heat losses, a sufficiently high interrupting capacity and a sufficiently high speed of operation in the low overcurrent range to be usable for the protection of germanium power rectifiers, provided that the effective length of the fuse link is drastically reduced, i.e. reduced to less than ⅜ of an inch and to the point of being shorter than the average back-burning length required in air to achieve the amount of arc elongation needed for interrupting the circuit of the germanium cell.

What is known and has been referred to as the back-burning length of the fuse link is a physical quantity depending upon a number of parameters such as conditions affecting the rate of deionization of the arc gap, circuit constants, current-density at the arc gap, nature of the metal of which the fuse link is made, etc. It is apparent that reducing the length of the fuse link to less than what is required to achieve permanent interruption of the circuit tends to render the fuse inoperative, and may actually result in inoperativeness of the fuse. In other words, a fuse having such a short fuse link may only be capable of carrying the required current and of fusing within the required time at a given small overcurrent but inoperative as an interrupting device. It can, however, be made into an operative interrupting device by immersing the fuse link in a pulverulent arc-quenching filler, such as quartz sand. Provision of such fillers reduces the required back-burning distance by virtue of the high energy absorbing capacity inherent in such fillers. The table below gives a number of coefficients which are indicative of the required back-burning length of a ribbon-type fuse link of a current-limiting fuse of given design when arranged in a given circuit.

| No. | Metal of Link | Filler | Coefficient of back-burning |
|---|---|---|---|
| 1 | Ag | Quartz Sand | 2.3 |
| 2 | Cu | do | 2.1 |
| 3 | Al | do | 3.4 |
| 4 | Al | Marble Meal | 1.2 |
| 5 | Zn | Quartz Sand | 4.8 |

I have found that quenching an arc by a pulverulent arc-quenching filler, as generally done in current-limiting fuses, is rather undesirable in the case of current-limiting fuses for germanium power rectifier protection. Germanium power rectifier protection is best achieved by fillerless current-limiting fuses, i.e. current-limiting fuses wherein quenching of the arc is effected without resorting to a pulverulent arc quenching filler medium. Only where the circuit voltage of the rectifier is particularly high, say in the order of 200 volts or more, use of a pulverulent filler cannot be avoided.

Since a germanium power rectifier cell may be damaged by a relatively small amount of excess energy, current-limiting fuses intended for germanium power rectifier protection must have very short pre-arcing times at overcurrents in the order of 5 times, or less, the rated current, yet once the arc is kindled within such a fuse the arc must be quenched sufficiently slowly to avoid generation of overvoltages tending to impair the germanium cell.

I have found that this latter condition can be reconciled with the proposed unprecedented reduction of link length if the arc is initially permitted to burn back in an air space wherein any relatively effective de-ionizing agent, such as a pulverulent siliceous filler, has been omitted or dispensed with, and if the arc is subjected to relatively effective or energetic de-ionizing means only after the whole length of the fuse link has been consumed by arcing. Thus the arc is acted upon relatively effectively only after the overcurrent responsible for blowing of the fuse has been caused to decay from its let-through peak to a considerably lower level. Since the circuit voltage in a germanium rectifier is generally relatively small, the necessary ultimate relatively effective quenching action may be achieved by providing across the fuse link a pair of transverse metallic barriers having such a high heat absorbing capacity as to be able to quench the arc instantly when being engaged by the roots or terminals thereof. In prior art current-limiting fuses the arc voltage tends to be relatively high at the time of arc initiation but decays rapidly during the arcing time. As is apparent from the foregoing I aim to limit the arc voltage at the time of arc initiation and to thereafter limit its decay or, in other words, to roughly maintain the arc voltage at a more uniform level.

The speed of a fuse is greatly increased if the mass of the neck of the fuse link is very small. The size of the neck ought to be so small as to result in current densities in the neck in excess of $4 \times 10^5$ amperes per square inch, preferably in excess of $5 \times 10^5$ amperes per square inch. In a preferred embodiment of my invention the normal current density at the point of the neck where the cross-sectional area is smallest is $5.36 \times 10^5$ amperes per square inch. The shortness of the effective length of the link—less than ⅜ of an inch, preferably as short as ¼ of an inch or even less—make it possible to dissipate all the heat generated in the neck, resulting in a steady state neck temperature $\vartheta_3$ between 300 and 200 degrees centigrade. Any overcurrent, even if relatively small, upsets the critical balance between heat generation and heat dissipation, i.e. any relatively small overcurrent results in a rapid rise of the neck temperature. The speed of temperature rise increases as the mass of the neck portion of the fuse link is decreased. The neck portion ought to be made sufficiently small to result in a rise of temperature to about 1000 degrees centigrade within about $\frac{1}{60}$ of a second at currents of less than 5 times the rated current of the fuse.

A germanium power diode sandwich combines the properties of high current-carrying capacity and of rapid temperature rise at relatively small overcurrents by virtue of the small thickness of the sandwich and the high current density prevailing therein. Coordination of a current-limiting fuse with a germanium power diode means to make the fuse substantially a thermal image of the diode, slightly more sensitive to small overcurrents than the diode itself. This is achieved by making the effective length of the fuse link ultra short—less than ⅜ of an inch—and the current density in the neck portion thereof ultra high—in excess of $4 \times 10^5$ amperes per square inch. By stressing these two parameters governing fuse performance—which are the analogs of the parameters of the germanium power diode to which it owes its high current-carrying capacity and its temperature rise characteristics—a type of current-limiting fuse is obtained matching germanium power diodes in regard to current-carrying capacity and outperforming germanium power diodes in regard to speed of self-destruction.

In a current-limiting fuse comprising a fuse link having the above geometry, i.e. an ultra short effective length and a neck portion sufficiently small to result in ultra high current densities therein, the ratio ρ, as above defined, may be in the order of 5:1, or even less, say 4.25:1, without making the neck portion of the link too fragile. The ratio ρ may also be considered a measure for the effective length of the link, assuming a neck portion of a predetermined size approximating a point heat source is given the dimensions of which are just sufficient to achieve the required mechanical strength of the fuse link. I have found that there is sufficient mechanical strength in a neck of an ultra short ribbon-type fuse link of silver, i.e. one whose effective length is less than 3/8 of an inch, preferably as short as 1/4 of an inch or less, even if the neck size is reduced to the point of resulting in current-densities in excess of $4 \times 10^5$ amperes per square inch. Neck size can be decreased without impairing dimensional stability if the length of the link is decreased accordingly. There are, however, practical limits for reducing neck size, or neck mass, as well as link length. The preferred and highly desirable ratio for $\rho$ of 4:1 to 3:1 can hardly be reached merely by combined reduction of neck size and link length. To obtain a current-limiting fuse having a link of reasonable mechanical strength and yet the ideal ratio for $\rho$ of 4:1, or less, another artifice is required. This artifice will be described as this specification progresses.

In Fig. 1 the temperature rise of a point heat source neck of a ribbon-type fuse link of a current-limiting fuse coordinated with a germanium rectifier cell for protection thereof has been shown diagrammatically and designated by the equation $\vartheta_{RF} = f(t)$.

The curve shown in Fig. 1 can be represented analytically by the following equation:

$$\vartheta = \frac{H}{1-\alpha \cdot H}\left(1 - \epsilon^{-\frac{1-\alpha \cdot H}{H} A \cdot t}\right)$$

wherein $\alpha$ is the temperature coefficient of resistance, H the heating intensity and A the initial rise in temperature upon inception of the overcurrent (see Reinhold Rüdenberg, Transient Performance of Electric Power Systems, McGraw-Hill Book Company, Inc., 1950, pp. 431–434). The former parameter is defined by the equation $$H = \frac{I_0^2 \cdot \nu_0}{\zeta \cdot O}$$

and the latter parameter is defined by the equation $$A = \frac{I_0^2 \cdot \nu_0}{\gamma \cdot V}$$

wherein $I_0$ is the current in the circuit under interruption;
$\nu_0$ the resistivity of the metal of the fuse link at ambient temperature;
$\zeta$ the coefficient of heat transmission taking account of radiation;
O the surface of the neck of the fuse link;
$\gamma$ the specific heat of the metal of which the fuse link is made; and
V the volume of the neck of the fuse link.

Figure 2:
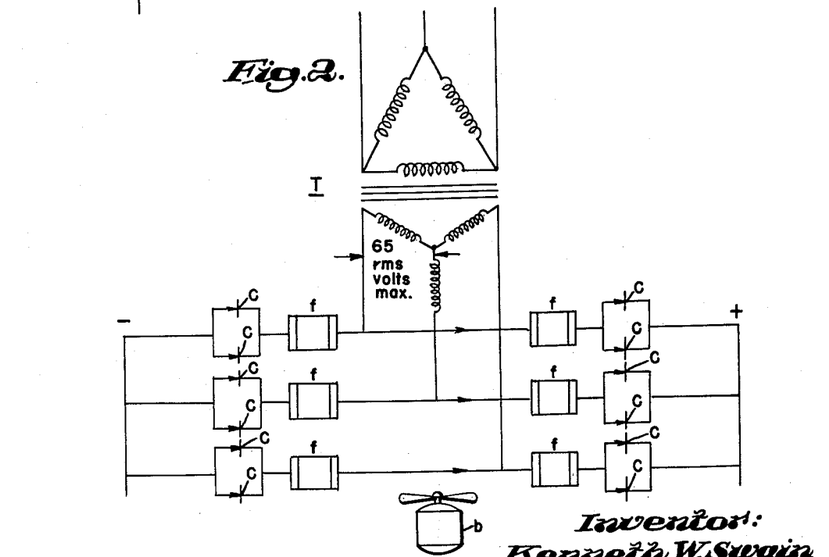
Fig. 2 is a wiring diagram of a coordinated rectifier and current-limiting fuse system.

Referring now to Fig. 2 showing a wiring diagram of a germanium rectifier, reference letter T has been applied to generally indicate a three phase transformer which is delta-Y connected. The voltage between phases has been assumed to be 65 R.M.S. volts. This voltage is the maximum operating voltage and the actual operating voltage may be lower. The six germanium cells $c$ are connected for double-way rectification and are protected in pairs by current-limiting fuses $f$. Each germanium rectifier cell $c$ is rated 83 1/3 amperes. This rating is in terms of average D.-C. amperes. The fuses $f$ are rated in R.M.S. amperes at about 300 amperes. The aforementioned way of rating rectifier cells and protective fuses is now in the process of being adopted in rectifier engineering. Reference letter $b$ has been applied to indicate a blower which, if desired, may be substituted by any other cooling device suitable for dissipating the heat generated in rectifier cells $c$.

It appears from the foregoing that each pair of cells $c$ will carry $2 \times 83\frac{1}{3}$ average D.-C. amps. = 166 2/3 amps. The D.-C. current in a load connected across conductors ± is $3 \times 166\frac{2}{3} = 500$ amps. The R.M.S. current flowing through each of the fuses $f$ and through each pair of cells $c$ connected in parallel may readily be calculated, and is about $.6 \times 500 = 300$ R.M.S. amps. The R.M.S. rating of each fuse is, therefore, 300 amps. and that of each cell $c$ is $$\frac{300}{2} = 150 \text{ R.M.S. amps.}$$

It is apparent from the foregoing that it is important when considering rectifier protection by fuses not to confuse ratings in average D.-C. amps. and ratings in R.M.S. amps. When each rectifier cell $c$ is protected by a single series fuse the current rating of the cell and fuse will be substantially the same, but in the above case, where one series fuse protects a pair of cells $c$ in parallel the current rating of the former is about twice that of the cells, as is apparent from the numerical data which have been given above.

It will be understood that the wiring diagram of Fig. 2 shows but one of the many known possibilities of connecting power diodes for rectification of A.-C. currents. These possibilities include half wave circuits, full wave center tap circuits, full wave bridge circuits, three-phase half wave circuits and three-phase bridge circuits.

Referring now to Figs. 3 and 4, numeral 1 has been applied to indicate a tubular casing of a suitable insulating material as, for instance, a synthetic-resin-glass-cloth-laminate. Casing 1 is mounted on a pair of cylindrical copper blocks 2 which have a relatively large mass and consequently a relatively large heat absorbing capacity. The spacing of the juxtaposed surfaces of copper blocks 2 is in the order of 1/4 of an inch and a link-receiving groove 2a is provided in each of these surfaces. A ribbon-type fuse link 3 is inserted into grooves 2a. Link 3 is made of a silver foil .028 of an inch thick and .455 of an inch wide. It is provided with two juxtaposed substantially V-shaped incisions defining therebetween a restricted cross-section portion or neck which is .020 of an inch wide. The link-receiving grooves 2a are in part filled with a soft solder to establish highly conductive connections between fuse link 3 and copper blocks 2. By virtue of the capillary action of the solder between the surfaces of the link 3 and the juxtaposed surfaces of grooves 2a, the solder, while still fluid, tends to flow out of the grooves 2a slightly toward the center of the link 3. This tendency of the solder to flow out of the grooves 2a toward the center of the link is responsible for a slight reduction of the effective length of the link to slightly less than the spacing between the juxtaposed surfaces of blocks 2, i.e. to slightly less than 1/4 of an inch. Link 3 is enclosed in an arcing chamber 1a defined by casing 1 wherein any relatively effective arc-quenching medium, such as a siliceous pulverulent filler, has been omitted.

In this particular embodiment of the invention an arc will be kindled within about one cycle of a 60 cycle current wave at the single restricted cross-section portion or neck of link 3 if the current reaches about 4.25 times the rated current of the fuse which is 300 R.M.S. amperes, or more. The arc gap initially formed is initially cooled relatively ineffectively by virtue of the absence of a pulverulent arc quenching filler within chamber 1a. When the entire 1/4 of an inch length of link 3 has been consumed by arcing the energy inherent in the rectifier circuit is not dissipated as yet in the form of heat, and there is consequently a tendency for arcing to continue. However, at this point, i.e. upon physical engagement of the arc roots or arc terminals by copper blocks 2, the arc is sufficiently cooled by the barrier action of blocks 2 to rapidly extinguish.

It will be understood that if caps of sheet metal having a relatively small heat absorbing capacity were substituted for the substantial copper blocks 2, the arc would then have a tendency to continue to burn upon engagement of the caps by the arc roots. The arc would have a tendency to burn holes into the caps, resulting in failure of the fuse. In Fig. 3 the normal back-burning distance of link 3 in air has been indicated by the reference letter L and the actual back-burning distance of link 3 achieved by the barrier action of blocks 2 has been indicated by the reference letter $l$.

To properly space the two barrier blocks 2 from each other the juxtaposed surfaces thereof are preferably provided with additional grooves 2b into which a pair of spacing plates 4 is inserted. Link 3 is arranged parallel to spacing plates 4 in spaced relation therefrom. Spacing plates 4 are preferably made of a synthetic-resin-glass-cloth laminate which is relatively heat resistant.

The structure thus far described will readily interrupt within about 1/60 of a second currents as low as about 4.21 times the rated current. If ratio $p$ is to be further reduced to the range of 4:1 to 3:1, as required for best coordination between germanium power rectifier cells and the current-limiting fuses provided for the protection thereof, the portion of reduced cross-section or neck of the fuse links must be reduced to the point of endangering, or imparing, the dimensional stability of the fuse link, or resulting in serious manufacturing and design difficulties. I have, therefore, devised a means other than excessive reduction of neck size for attaining the high speed of operation at relatively small overcurrents required for perfect germanium rectifier and current-limiting fuse coordination.

The choice of a metal suitable for making the fuse links of current-limiting fuses is a compromise between various properties of metals. Properties of prime importance are the energy required to increase the temperature of a metal from ambient to the fusing point, which energy depends upon the specific heat and upon the fusing point of the particular metal, the latent heat of fusion of the metal and the heat of vaporization thereof. The smaller these quantites, the faster the operation of the fuse. Another very important property of a metal with regard to its fitness as a material for fuse links is its current-carrying ability expressed in terms of resistivity or conductivity at ambient temperature. The energy required to heat a metal to the fusing point, the required latent heat of fusion the required heat of vaporization and the total heat required for rupturing a conductor can be expressed in terms of $\int i^2 \cdot dt$. The table below indicates the resistivity $r_0$ of some metals at ambient temperature and, in addition thereto, some values of $\int i^2 \cdot dt$. These values are physical characteristics of the particular metal as its specific gravity, tensile strength, etc.

| Metal | $r_0$ Resistivity at ambient | $\int i^2 \cdot dt$ to reach fusing temperature | $\int i^2 \cdot dt$ to cause fusion | $\int i^2 \cdot dt$ to heat to point of vaporization | sum of all three $Ki^2.d^5$ |
|---|---|---|---|---|---|
| silver | $1.63 \times 10^{-6}$ | $5.91 \times 10^8$ | $1.02 \times 10^8$ | $1.07 \times 10^8$ | $8.00 \times 10^8$ |
| copper | $1.724 \times 10^{-6}$ | $8.63 \times 10^8$ | $1.33 \times 10^8$ | $1.76 \times 10^8$ | $11.72 \times 10^8$ |
| zinc | $6.20 \times 10^{-6}$ | $1.096 \times 10^8$ | $.338 \times 10^8$ | $.386 \times 10^8$ | $1.82 \times 10^8$ |

While the $\int i^2 \cdot dt$ values of zinc as well as those of other metals whose respective fusing point is relatively low are relatively low, the resistivity of zinc and of other metals whose fusing points are relatively low is quite high. To carry a given current by means of a metallic conductor having a relatively low fusing point and relatively low $\int i^2 \cdot dt$ values requires a relatively large mass of the metal on account of its high resistivity or low conductivity. As a result, the current-limiting action of a fuse having a given current rating is larger if the fuse link thereof is made of a metal such as silver or copper having a relatively high fusing point and high $\int i^2 \cdot dt$ values but a relatively low resistivity than the current-limiting action of a comparable fuse provided with a fuse link of a low fusing point, low $\int i^2 \cdot dt$ value, high resistivity metal. For these reasons it has become axiomatic to use silver for fuse links of current-limiting fuses supposed to have the highest possible current-limiting action.

I have discovered that speedier interruption than with fuse links of silver, i.e. interruption involving smaller values of $\int i^2 \cdot dt$, can be achieved by resorting to certain alloying phenomena well known in the fuse art which have, heretofore, been applied to delay the operation of fuses, or to produce time lag rather than to increase the speed of operation. If certain alloy-forming metals are brought into physical contact with each other and heated to the fusing point of the one of the two metals which has the lower fusing point, the high fusing point metal diffuses into the low fusing point metal, or both metals interdiffuse, resulting in a solution of one metal in the other. If, for instance, a link of silver is covered with a globule of tin solder and caused to carry a current sufficiently high to cause fusion of the tin, silver-tin-alloys are formed having a relatively high resistivity. This causes increased heat generation, increased diffusion at the boundary area of the two metals and ultimate destruction of the silver link. Tin may be used as link-destroying allow-forming agent on silver as well as on copper links. Similarly lead, or lead-tin alloys or cadmium may be used as link-destroying alloy-forming agents. Selenium has also been reported to be an effective link-destroying agent. To destroy silver links at relatively low temperatures overlays of indium or alloys of indium may be used as disclosed in detail in United States Patent 2,703,352 to Frederick J. Kozacka, Fuse and Fuse Link of the Time Lag Type, issued March 1, 1955. If the mass of the link-destroying low fusing point metal is relatively large, addition of such a mass to the high fusing point link increases the blowing time of the fuse. For this reason the link-destroying action of alloy-forming low fusing point metals is generally applied where it is desired to obtain long time-delays in the low overcurrent range. Such time delays are necessary to enable fuses to carry temporary small overcurrents, such as produced by closing the circuit of a bank of incandescent lamps, or by starting a motor.

I have found that the very same phenomenon of link-destruction by alloy-formation generally used to obtain increased blowing times at overcurrents in the order of several hundred percent of the rated current can be used to drastically reduce the blowing times of a fuse in the very same range of overcurrents.

This apparent paradox may be explained as follows: Where the mass of the link-destroying alloy-forming metal is relatively large, the heat capacity inherent in such a mass tends to increase the time required to blow a fuse. Where, however, the mass of link-destroying alloy-forming metal is very small, the time required to blow a fuse may be considerably shortened by the presence of such a metal.

Normally the link-destroying alloy-forming metal is arranged relatively remote from, rather than immediately adjacent to, or directly over, a portion of restricted cross-section or neck of the fuse link. The reason for this is that necks operate generally at a relatively high temperature. If a link-destroying alloy-forming metal were placed directly upon a neck operating at a relatively high temperature, this would result in a drastic reduction of the minimum fusing current of the particular fuse. However, a neck which comes fairly close to a point heat source and is formed in a super short fuse link can operate at current densities in excess of $4 \times 10^5$ amps. per square inch without reaching the fusing temperature of tin, or another soft solder type metal.

Link-destruction by alloy-formation becomes rapidly more critical the smaller the mass of high fusing point metal that must be eliminated by dissolution to rupture the fuse link, the larger the area of interaction between the high fusing point metal and the low fusing point metal and the higher the temperature at which the metallurgical reaction occurs. These prerequisites for critical action between the high fusing point metal and the low fusing point metal can be fully met by the structure shown in Figs. 3 and 4. To this end, the link 3 of silver is electrolytically tin plated at the point of smallest cross-sectional area thereof, or otherwise provided at this particular point with a very small overlay of tin, or other link-destroying low fusing point metal. In other words, by providing a critically small mass of link-destroying alloy-forming metal directly adjacent to the neck of the fuse link, the $\int i^2 \cdot dt$ required for rupturing the reduced cross-section portion or neck thereof may be reduced to less than the $\int i^2 \cdot dt$ required for rupturing the neck or reduced cross-section portion without presence of the alloy-forming mass. The effect of the small overlay of tin directly on the neck of the fuse seems to cause a virtually instant dissolution of the neck in the small overlay of tin, resulting in link-destruction at a greater speed than link-destruction by fusion and vaporization of one single metal, i.e. without the destructive action of alloy-formation.

Figure 6:
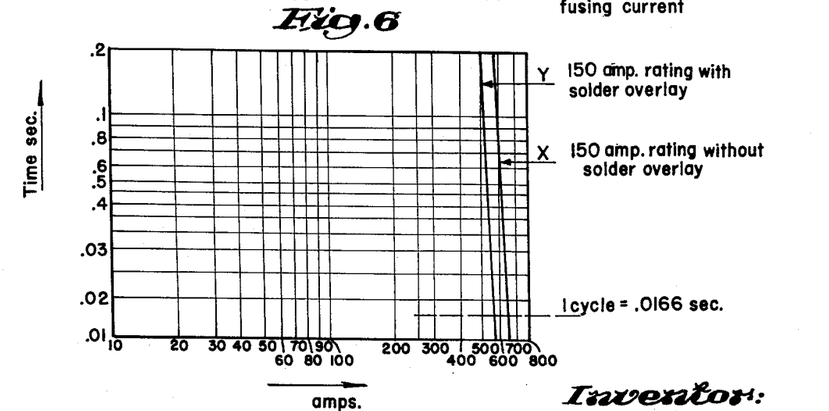

In Fig. 6 lines X and Y show crucially important portions of the time-current characteristic of fuses embodying the invention. Characteristic X refers to a fuse as shown in Figs. 3 and 4 having a fuse link of silver without an overlay of low melting point solder and characteristic Y refers to a fuse identical to the fuse whose characteristic is X except for the addition of an overlay of tin solder on the neck of its link. The mass of that overlay is so small that it has no effect whatever on the current-carrying capacity of the fuse. While it is true that the overlay reduces the temperature at which link destruction is effected, the rating of the present fuses is predicted upon permissible heat generation at the rated current, and it is apparent that heat generation at the rated current is not affected by the overlay. Addition of the overlay results, however, in an increase of speed of operation. Both fuses whose characteristics are shown in Fig. 6 are rated at 150 amps. The fuse without overlay of tin on the neck of the link thereof has a $\rho=4.25$, whereas the fuse having an overlay of tin on the neck of the link thereof has a $\rho=3.9$. The former is acceptable, and the latter ideal, for the protection of germanium power diodes.

Characteristics X and Y have been arrived at by means of oscillograms. During the numerous tests which yielded the data for these oscillograms the fault angle at which the overcurrent was caused to occur was not controlled. Hence characteristics X and Y are predicated on a random fault angle and reflect conditions as they would occur in the field.

The exponential curve $$\vartheta_{RF}{}^1 = f(t)$$

shown in Fig. 1 representing rise of temperature with time refers to the operation of a current-limiting fuse with a super short ribbon-type fuse link of silver with a critically thin overlay of tin on a neck approximating a point heat source wherein the normal current density is in excess of $5 \times 10^5$ amps. per square inch. The steady state temperature $\vartheta_3$ of the neck is in the order of 200 degrees centigrade in spite of the fact of the high density of current therein. At the occurrence of an overcurrent the temperature of the neck rises rapidly to the fusing point of tin.

$\vartheta_{RF} = f(t)$ and $\vartheta_{RF}{}^1 = f(t)$ refer to fuses which are identical except for the fact that the fuse link of one is not provided, and the fuse link of the other is provided with a critically small overlay of tin at the neck portion thereof. The mass of tin causes the initial rate of rise of the temperature of the tinned neck to be slightly less than the initial rate of rise of the non-tinned neck. When $\vartheta_{RF}{}^1$ has reached 230 degrees the temperature remains substantially constant during a short interval $\Delta t$. During that interval $\Delta t$ the circuit provides the energy for complete fusion of the overlay of tin. Thereafter the temperature of the neck continues to rise at a rate slightly less than in the case of the untinned neck. As the temperature rises above the fusing point of tin, the metallurgical reaction between tin and silver increases at an ever increasing rate. Ultimately the link is ruptured at the time $t_3$, considerably earlier than the time at which the link in the comparable fuse without overlay of tin is ruptured. Rupturing occurs at a temperature way below the fusing point of silver.

While the characteristics shown in Fig. 1 are diagrammatic, the mode of operation which they illustrate has been verified experimentally as clearly shown in Fig. 6.

The ratio of the width of the neck portion of the fuse link to the maximum width thereof may vary within relatively wide limits and should generally be 1:20, or less. In the above numerical example the width of the neck portion was .020" and the maximum width of the link .455" which makes a ratio of 1:22.7. This ratio is, however, just one of the parameters determining the behavior of the fuse and must concur with current densities in excess of $4 \times 10^5$ amperes per square inch, preferably current densities in excess of $5 \times 10^5$ amperes, and link lengths less than 3⁄8 of an inch, to result in a fuse link and fuse having the desirable ratio $\rho$. The reduced cross-section portion or neck of the link ought to be sufficiently small to result in a temperature rise to about 1000 degrees centigrade within about .0166 of a second (or one cycle of a current wave of 60 cycles per sec.) on currents less than 5 times the rated current. If such a fuse link is then provided with a thin overlay of tin or a similar link-destroying alloy-forming metal at the neck portion thereof, the neck portion will not reach 1000 degrees centigrade prior to arc initiation, but rupture of the neck will occur well below the fusing point of the metal of which the neck is made and within a shorter time than can be achieved with any monometallic fuse link, as distinguished from multimetallic fuse links.

While the speed of a current-limiting fuse expressed in terms of the ratio $\rho$ is an important indication for its ability to protect germanium power rectifiers, a full appraisal of the ability of a current-limiting fuse to protect germanium power rectifiers calls for consideration of the entire current-time characteristic thereof. The effect of increasing speed of operation by associating a neck wherein the current density exceeds $4 \times 10^5$ amperes per square inch with a critically small mass of link-destroying alloy-forming metal becomes more apparent when considering the magnitude of the currents required to cause blowing of the fuse within say three rather than one cycle. In other words, these effects become more apparent when considering what times are required to cause blowing at currents as low as 3 times, or slightly more than three times, the rated current of the fuse. A fuse of the type shown in Figs. 3 and 4 rated at 300 amps. and having normally a neck current-density slightly above $5 \times 10^5$ amperes blew within 10 seconds upon being subjected to an overcurrent of 1000 amperes. After coating of the neck with a layer of tin about 1⁄1000 of an inch thick the blowing time at an overcurrent of 1000 amperes was reduced to .35 second, while fuses according to this invention are sufficiently fast in the range above three times current rating to effectively protect any germanium or similar rectifier cell I am familiar with, it is necessary to compare in any particular case of protection blowing times at relatively lower currents with the danger characteristics of the cells to be protected.

Where a fuse is required to carry relatively large currents, e.g. 600 amperes, the basic structure shown in Figs. 3 and 4 is still applicable, yet several fuse links ought to be connected in parallel into the circuit of which each may be identical to link 3 shown in Figs. 3 and 4.

Normally a ribbon-type fuse link is a unitary piece of sheet metal produced by an appropriate stamping operation. As the width of the neck portion of a ribbon-type fuse link is being progressively decreased to increase the sped of operation, it becomes more and more difficult to produce satisfactory ribbon-type fuse links by mere stamping operations. It may then be necessary to make up composite ribbon-type fuse links of which the axially outer ends consist of stampings of sheet metal, and of which the neck portion consists of a separate wire conductively connected, e.g. soldered, to the axially outer portions. The term ribbon-type fuse link as used in this context is intended to cover both the unitary sheet metal and the composite wire and sheet metal version of such links.

This invention is not limited to coordinated germanium power rectifier and current-limiting fuse systems; it is also applicable to static power rectifiers other than germanium rectifiers. Particular benefits result from the application of the invention where the characteristics of the static rectifier cells are similar to those of germanium cells. This applies to silicon rectifiers wherein current densities are also very high, also calling for air blast or other effective cooling means. Silicon rectifiers are capable of withstanding considerably higher temperatures than germanium rectifiers, but silicon rectifiers are also very sensitive to changes in the rate of current flow.

It will be understood that the parameters upon which $p$ depends are interrelated. Increased current carrying capacity may be achieved by shortening the effective length of the link as well as by increasing the mass of the portion of restricted cross-sectional area or neck of the fuse link. $p$ depends upon speed of operation as well as upon current-carrying capacity.

The system of protection which is useful for germanium power diodes and related rectifiers can be applied in other instances calling for comparatively rapid response at relatively small overloads and, therefore, I do not wish to limit my invention to coordinated power rectifier and current-limiting fuse systems.

It is well known that the $\int i^2 \cdot dt$ values required for link destruction are constant values only where the heating times are sufficiently short to permit to neglect heat exchange phenomena during the heating time. If the term $\int i^2 \cdot dt$ is applied in connection with heating times of .0166 sec., or 16 milliseconds, this term has the meaning of a first approximation to the exact value arrived at at shorter heating times.

It will be understood that I have illustrated and described a preferred embodiment of my invention and that various alterations may be made in the details thereof without departing from the invention as defined in the appended claims.

I claim:
1. A coordinated static power rectifier and current-limiting fuse system comprising an A.-C. power source, a rectifier cell normally carrying a high current arranged in the circuit of said source, said cell having such a small ratio of mass to said current as to be susceptible of becoming thermally impaired by currents less than five times said current, cooling means for limiting the temperature rise of said cell, and a current-limiting fuse serially connected with said cell into said circuit, said fuse comprising a ribbon-type fuse link immersed in air only having an effective length of less than ⅜ of an inch and one single reduced cross-section portion approximating a point heat source, and barrier means at the axially outer ends of said link precluding arc elongation beyond said effective length.

2. A coordinated static power rectifier and current-limiting fuse system comprising an A.-C. power source, a germanium cell arranged in the circuit of said source, and a current-limiting fuse serially connected with said cell into said circuit, said fuse including a ribbon-type fuse link of silver having an effective length in the order of ¼ of an inch immersed in air only and provided with a reduced cross-section portion approximating a point heat source normally carrying a current in excess of $4 \times 10^5$ amperes per square inch, said fuse further comprising highly heat absorbent metallic barrier means precluding arc elongation beyond said effective length of said link.

3. A coordinated static power rectifier and current-limiting fuse system comprising an A.-C. power source, a germanium cell arranged in the circuit of said source, and a current-limiting fuse serially connected with said cell into said circuit, said fuse comprising a ribbon-type fuse link of silver immersed in air only having one single reduced cross-section portion approximating a point heat source normally carrying a current in excess of $4 \times 10^5$ amperes per square inch, the effective length of said link being sufficiently short to reduce to less than 5:1 the ratio of the current required to blow said fuse within approximately .0166 second to the rated current of said fuse.

4. A coordinated high current density small mass power diode and current-limiting fuse system comprising an A.-C. power source, a germanium power diode arranged in the circuit of said source, and a current-limiting fuse serially connected with said diode into said circuit, said fuse comprising a ribbon-type fuse link of silver having one single reduced cross-section portion approximating a point heat source, the effective length of said link being less than ⅜ of an inch and sufficiently small to reduce to less than 4.5:1 the ratio of the current required to blow said fuse within ¹⁄₆₀ sec. to the rated current of said fuse.

5. A coordinated static power rectifier and current-limiting fuse system comprising an A.-C. power source, a high current density small mass type rectifier cell arranged in the circuit of said source, said cell having a predetermined current rating and being susceptible of becoming thermally impaired at overcurrents less than five times said current rating, and a current-limiting fuse serially connected with said cell into said circuit, said fuse comprising a ribbon-type fuse link of silver having one single reduced cross-section portion approximating a point heat source, and an alloy-forming mass of low fusing point metal on said reduced cross-section portion sufficiently small to reduce the rupturing period of said reduced cross-section portions at currents of 4 times said current rating to less than .0166 of a second and to a shorter time than required under identical conditions in the absence of said alloy-forming mass.

6. A coordinated static power rectifier and current-limiting fuse system comprising an A.-C. power source, a high current density small mass rectifier cell tending to become thermally impaired at currents less than 5 times the normal current carrying capacity of said cell arranged in the circuit of said source, and a current-limiting fuse serially connected with said cell into said circuit, said fuse comprising a ribbon-type fuse link of silver having an effective length of less than 1 inch and one single reduced cross-section portion approximating a point heat source, and a link-destroying alloy-forming mass of low fusing point metal immediately adjacent said reduced cross-section portion, said alloy-forming mass being sufficiently small to reduce the $\int i^2 \cdot dt$ required for rupturing said reduced cross-section portion in times less than .0166 sec. to less than the $\int i^2 \cdot dt$ required for rupturing said reduced cross-section portion without presence of said alloy-forming mass.

7. A coordinated static power rectifier and current-limiting fuse system comprising an A.-C. power source, a germanium cell arranged in the circuit of said source, and a current-limiting fuse serially connected with said cell into said circuit, said fuse comprising a ribbon-type fuse link of silver having an effective length of less than ⅜ of an inch immersed in air only and provided with a reduced cross-section portion normally carrying more than $4 \times 10^5$ amps. per square inch, a link-destroying alloy-forming mass of low fusing point metal on said reduced cross-section portion sufficiently small to reduce the $\int i^2 \cdot dt$ required for rupturing said reduced cross-section portion to less than the $\int i^2 \cdot dt$ required for rupturing said reduced cross-section portion without said alloy-forming mass present, and barrier means at the axially outer ends of said link precluding arc-elongation beyond said effective length.

8. A coordinated static power rectifier and current-limiting fuse system comprising an A.-C. power source, a high current density small mass rectifier cell arranged in the circuit of said source, and a current-limiting fuse serially connected with said cell into said circuit, said fuse comprising a ribbon-type fuse link of silver having one single reduced cross-section portion approximating a point-heat-source normally carrying currents in excess of $4 \times 10^5$ amps. per square inch, an overlay of an alloy-forming low fusing point metal on said reduced cross-section portion sufficiently small to reduce the $\int i^2 \cdot dt$ required for rupturing said reduced cross-section portion to less than the $\int i^2 \cdot dt$ required for rupturing said reduced cross-section portion without presence of said alloy-forming mass, and arc-quenching barrier means at the axially outer ends of said link.

9. A coordinated power rectifier and current-limiting fuse system as specified in claim 8 wherein said reduced cross-section portion carries normally currents in excess of $5 \times 10^5$ amperes per square inch and wherein said link is sufficiently short to reduced to less than 4:1 the ratio of the current required to blow said fuse within approximately .0166 second to the rated current of said fuse.

10. A coordinated static power rectifier and current-limiting fuse system comprising an A.-C. power source, a high current density small mass rectifier cell tending to become thermally impaired at currents less than five times the normal current carrying capacity of said cell arranged in the circuit of said source, and a current-limiting fuse serially connected with said cell into said circuit, said fuse comprising a ribbon-type fuse link having one single reduced cross-section portion approximating a point heat source and normally carrying a current in excess of $4 \times 10^5$ amperes per square inch, the effective length of said link being sufficiently short to reduce to less than 4.5:1 the ratio of the current required to blow said fuse within one cycle of a 60 cycle current wave to the rated current of said fuse.

11. A current-limiting fuse comprising a tubular casing of insulating material, terminal elements arranged at the axially outer ends of said casing, a ribbon-type fuse link of silver arranged within said casing conductively interconnecting said terminal elements, said fuse link having one single portion of reduced cross-sectional area formed by a pair of lateral V-shaped incisions situated between the axially outer ends thereof, and a link-destroying alloy-forming mass of low fusing point metal on said fuse link arranged immediately adjacent said portion of reduced cross-sectional area thereof, said mass being sufficiently small to reduce the $\int i^2 \cdot dt$ required for rupturing said fuse link in times less than .0166 sec. to less than the $\int i^2 \cdot dt$ required for rupturing said fuse link without said link-destroying action of said mass.

12. A current-limiting fuse as specified in claim 11 wherein said alloy forming mass is an electroplated deposit.

13. A current-limiting fuse comprising a tubular casing of insulating material, terminal elements arranged at the axially outer ends of said casing, a ribbon-type fuse link of silver arranged within said casing conductively interconnecting said terminal elements, a portion of reduced cross-sectional area on said fuse link less than 1/20 of the maximum cross-sectional area thereof situated between the axially outer ends of said fuse link, a body of a link-destroying alloy-forming relatively low fusing point metal arranged immediately adjacent said reduced cross-sectional area portion, the mass of said body being sufficiently small to reduce the $\int i^2 \cdot dt$ required for rupturing said reduced cross-sectional area portion in times less than .0166 sec. to less than the $\int i^2 \cdot dt$ required for rupturing said reduced cross-sectional area portion without presence of said body.

14. An electric circuit normally carrying an electric current and a current-limiting fuse arranged in said circuit, said fuse comprising a fuse link having a portion wherein the current-density exceeds $4 \times 10^5$ amperes per square inch, means for dissipating the heat generated in said portion of said link sufficiently effective to limit the normal temperature of said high current density portion below 300 degrees centigrade, a body of a link-destroying alloy-forming low fusing point metal having a fusing point above said normal temperature supported by said link immediately adjacent said high current density portion thereof, the mass of said body being sufficiently small to reduce the $\int i^2 \cdot dt$ required for rupturing said high current density portion in times less than .0166 sec. to less than the $\int i^2 \cdot dt$ required for rupturing said high current density portion without presence of said body.

15. In combination an electric circuit normally carrying a predetermined current, and a current-limiting fuse having a predetermined current rating arranged in said circuit, said fuse comprising a tubular casing of insulating material, terminal elements arranged at the axially outer ends of said casing, a ribbon-type fuse link of a metal having a relatively high conductivity and a relatively high fusing point arranged within said casing conductively interconnecting said terminal elements, said fuse link having a single reduced cross-section portion sufficiently small to result in normal current densities of more than $4 \times 10^5$ amperes per square inch and to result in a temperature rise to about 1000 degrees centigrade within about .0166 of a second on currents of less than 5 times the rated current of said fuse, means for dissipating the heat generated in said reduced cross-section portion sufficiently effective to limit the normal temperature of said reduced cross-section portion below 300 degrees centigrade, and a body of an alloy-forming low fusing point metal having a fusing point above said normal temperature supported by said link immediately adjacent said reduced cross-section portion thereof, the mass of said body being sufficiently small to reduce the $\int i^2 \cdot dt$ required for rupturing said reduced cross-section portion within less than .0166 sec. to less than the $\int i^2 \cdot dt$ required for rupturing said reduced cross-section portion without presence of said mass.

16. In combination an electric circuit, a semiconductor rectifier cell having a predetermined current rating arranged in said circuit, said cell having such a small ratio of mass to said current rating as to be susceptible to become thermally impaired by overcurrents less than five times said current rating even if said overcurrents are as short as .0166 sec., and a current-limiting fuse arranged in said circuit in series with said rectifier cell, said fuse comprising a fuse tube, a pair of metal plugs closing both ends of said fuse tube, a silver metal ribbon inside said fuse tube conductively interconnecting said pair of plugs, said ribbon having a pair of substantially V-shaped lateral incisions forming a point of drastically reduced cross-section and minimal length, the dimensions of said point of reduced cross-section being sufficiently small to cause blowing of said fuse at currents less than five times said predetermined current rating of said cell, and the width and the length of said ribbon being such as to impart to said fuse at least the same current rating as said current rating of said cell.

17. A combination as set forth in claim 16 wherein said semiconductor rectifier cell is a germanium rectifier cell.

18. A combination as set forth in claim 16 wherein said semiconductor rectifier cell is a silicon rectifier cell.

19. A combination as set forth in claim 16 wherein said ribbon is plated with a layer of silver-corroding low-fusing point metal which is so thin as to reduce the blowing times of said fuse at the occurrence of currents in excess of five times said current rating of said cell to shorter times than those obtaining under identical conditions in the absence of said layer.

20. In combination an electric circuit, a semiconductor rectifier cell having a predetermined current rating arranged in said circuit, said cell having such a small ratio of mass to said current rating as to be susceptible to damage at overcurrents less than five times said current rating even if said overcurrents are as short as .0166 sec., a current-limiting fuse arranged in said circuit in series with said rectifier cell, said fuse comprising a fuse tube of insulating material, a pair of terminal elements each arranged at one end of said fuse tube, a silver metal ribbon inside said fuse tube conductively interconnecting said pair of terminal elements, said ribbon having one single point of reduced cross-section sufficiently short in length and small in cross-sectional area to cause blowing of said fuse at currents less than six times said predetermined current rating, a critically thin overlay of a corroding low fusing point metal on said ribbon adjacent said point of reduced cross-section thereof reducing the blowing times of said fuse at currents less than five times said current rating to less than the blowing times obtaining under identical conditions in the absence of said overlay, and the width and the length of said ribbon being such as to impart to said fuse at least the same current rating as said current rating of said cell.

21. In combination an electric circuit, a semiconductor rectifier cell having a predetermined current rating arranged in said circuit, said cell having such a small ratio of mass to said current rating as to be susceptible to thermal damage by overcurrents less than 5 times said current rating even if said overcurrents are as short as .0166 sec., a current-limiting fuse arranged in said circuit in series with said cell, said fuse comprising a fuse tube of insulating material, a pair of terminal elements one on each end of said fuse tube, a silver metal ribbon inside said fuse tube immersed in air conductively interconnecting said pair of terminal elements, said ribbon having one single point of reduced cross-section sufficiently short in length and small in cross-sectional area to cause blowing of said fuse at currents less than six times said predetermined current rating of said cell, the spacing of said terminal elements being less than the maximum back-burning length of said ribbon if immersed in air in filler-less space, said terminal elements having a sufficiently large mass and concomitant cooling action to quench upon complete burn-back of said ribbon the arc formed in said fuse, and the width and length of said ribbon being such as to impart to said fuse at least the same current rating as said predetermined current rating of said cell.

22. In combination an electric circuit, a semiconductor rectifier cell having a predetermined current rating arranged in said circuit, said cell having such a small ratio of mass to said current rating as to be susceptible to thermal damage by currents less than 5 times said predetermined current rating even if said excess currents are as short as .0166 sec., a current-limiting fuse arranged in said circuit in series with said cell, said fuse comprising a fuse tube of insulating material, a pair of terminal elements one on each end of said fuse tube, a silver metal ribbon inside said fuse tube conductively interconnecting said pair of terminal elements, said ribbon having a point of reduced cross-section sufficiently short in length and small in cross-sectional area to cause blowing of said fuse at currents less than 5 times said predetermined current rating of said cell, the width of said ribbon and the length thereof being such as to impart to said fuse at least the same current rating as said predetermined current-rating of said cell, and de-ionizing means inside said fuse tube associated with said ribbon to reduce the required burn-back length of said ribbon to less than the required burn-back length in air, said de-ionizing means being adapted to quench the arc formed inside of said fuse upon blowing thereof without arc-immersion in a pulverulent substance.

23. In combination an electric circuit, a semiconductor rectifier cell having a predetermined current rating arranged in said circuit, said cell having such a small ratio of mass to current rating as to become susceptible to thermal damage by excess currents less than five times said current rating even if said currents last less than .0166 sec., a current-limiting fuse arranged in said circuit in series with said cell, said fuse comprising a fuse tube of insulating material, a pair of terminal plugs one on each end of said fuse tube, a plurality of parallel grooves in the axially inner surfaces of said pair of plugs, a silver metal ribbon conductively interconnecting said pair of plugs held in position by one of said plurality of grooves in each of said surfaces of said pair of plugs, said ribbon having one single pair of substantially V-shaped lateral incisions forming a point of drastically reduced cross-section and minimal length, the dimensions of said point of reduced cross-section being sufficiently small to cause blowing of said fuse at currents less than 5 times said predetermined current rating of said cell, a plated overlay of a silver-corroding low fusing point metal on said ribbon adjacent said point of reduced cross-section thereof sufficiently thin to reduce the blowing times of said fuse at currents less than five times said current rating to less than the blowing times obtaining under identical conditions in the absence of said overlay, the width and length of said ribbon being such as to impart to said fuse at least the same current rating as said predetermined current rating of said cell, a pulverulent arc-quenching filler inside of said fuse tube submersing said ribbon, and a pair of plates of insulating material spacing said pair of plugs and held in position by two of said plurality of grooves in each of said surfaces of said pair of plugs.

24. In combination an electric circuit, a plurality of semiconductor rectifier cells each having a predetermined current rating arranged in parallel in said circuit, each of said plurality of cells having such a small ratio of mass to current rating as to be susceptible to thermal damage by overcurrents less than five times said current rating even if said overcurrents are as short as 0.166 sec., a current-limiting fuse arranged in said circuit in series with said plurality of cells, said fuse comprising a fuse tube, a pair of metal plugs closing both ends of said fuse tube, a silver metal ribbon inside said fuse tube conductively interconnecting said pair of plugs, said ribbon having a pair of substantially V-shaped lateral incisions forming a point of drastically reduced cross-section and minimal length, the dimensions of said point of reduced cross-section being sufficiently small to cause blowing of said fuse at currents in any of said plurality of cells less than five times said predetermined current rating, and the width of said ribbon and the length thereof being such as to impart to said fuse at least the same current rating as the aggregate current rating of said plurality of cells.

25. In combination an electric circuit, a plurality of semiconductor rectifier cells each having a predetermined current rating arranged in parallel in said circuit, each of said plurality of cells having such a small ratio of mass to current rating as to be susceptible to thermal damage by overcurrents less than five times said current rating even if said overcurrents are as short as .0166 sec., a current-limiting fuse arranged in said circuit in series with said plurality of cells, said fuse comprising a fuse tube of insulating material, a pair of terminal elements closing both ends of said fuse tube, a silver metal ribbon inside said fuse tube conductively interconnecting said pair of terminal elements, said ribbon having a pair of substantially V-shaped lateral incisions forming a point of drastically reduced cross-section and minimal length, the dimensions of said point of reduced cross-section being sufficiently small to virtually form a point-heatsource when said ribbon is carrying current, an overlay of a low-fusing point silver-corroding metal on said ribbon sufficiently thin to reduce the fusing $\int i^2 \cdot dt$ of said point of reduced cross-section in times less than .0166 sec. to less than the fusing $\int i^2 \cdot dt$ required in the absence of said overlay, and the width of said ribbon and the length thereof being such as to impart to said fuse at least the same current rating as the aggregate current rating of said plurality of cells.

References Cited in the file of this patent

UNITED STATES PATENTS

| | | |
|---|---|---|
| 1,629,266 | Feldkamp | May 17, 1927 |
| 2,327,511 | Lange et al. | Aug. 24, 1943 |
| 2,338,907 | Lange et al. | Jan. 11, 1944 |
| 2,471,011 | Shapiro | May 24, 1949 |
| 2,734,111 | Kozacka | Feb. 7, 1956 |
| 2,734,112 | Kozacka | Feb. 7, 1956 |
| 2,815,414 | Iwantscheff et al. | Dec. 3, 1957 |

FOREIGN PATENTS

| | | |
|---|---|---|
| 300,160 | Great Britain | Oct. 29, 1928 |

UNITED STATES PATENT OFFICE

CERTIFICATE OF CORRECTION

Patent No. 2,921,250　　　　　　　　　　　　　January 12, 1960

Kenneth W. Swain

It is hereby certified that error appears in the printed specification of the above numbered patent requiring correction and that the said Letters Patent should read as corrected below.

Column 9, in the table, heading to column 6, the formula should appear as shown below instead of as in the patent:

$$\int i^2 \cdot dt$$

column 11, line 33, for "predicted" read -- predicated --.

Signed and sealed this 30th day of August 1960.

(SEAL)
Attest:

ERNEST W. SWIDER
Attesting Officer

ROBERT C. WATSON
Commissioner of Patents